(12) United States Patent
Chin et al.

(10) Patent No.: US 9,251,223 B2
(45) Date of Patent: Feb. 2, 2016

(54) ALTERNATIVE WEB PAGES SUGGESTION BASED ON LANGUAGE

(71) Applicant: Google Inc., Mountain View, CA (US)

(72) Inventors: Jeffrey Chin, Medina, WA (US); Jun Yin, Mountain View, CA (US); Christopher Semturs, Ottenbach (CH); Joshua James Estelle, San Francisco, CA (US)

(73) Assignee: Google Inc., Mountain View, CA (US)

( * ) Notice: Subject to any disclaimer, the term of this patent is extended or adjusted under 35 U.S.C. 154(b) by 153 days.

(21) Appl. No.: 13/777,092

(22) Filed: Feb. 26, 2013

(65) Prior Publication Data

US 2013/0226896 A1 Aug. 29, 2013

Related U.S. Application Data

(60) Provisional application No. 61/604,976, filed on Feb. 29, 2012.

(51) Int. Cl.
*G06F 17/30* (2006.01)

(52) U.S. Cl.
CPC .... *G06F 17/30554* (2013.01); *G06F 17/30867* (2013.01)

(58) Field of Classification Search
CPC .............. G06F 17/30554; G06F 17/30867
USPC ......................................................... 707/709
See application file for complete search history.

(56) References Cited

U.S. PATENT DOCUMENTS

| 6,623,529 | B1* | 9/2003 | Lakritz | 715/205 |
| 8,117,194 | B2* | 2/2012 | Zhao et al. | 707/723 |
| 2001/0054086 | A1* | 12/2001 | Miyahira | 709/218 |
| 2002/0038357 | A1* | 3/2002 | Haverstock et al. | 709/218 |
| 2002/0083181 | A1* | 6/2002 | Decime | 709/230 |
| 2002/0123879 | A1* | 9/2002 | Spector | 704/2 |
| 2003/0005159 | A1* | 1/2003 | Kumhyr | 709/246 |

(Continued)

OTHER PUBLICATIONS

Ted Pederson et al, "Identifying Similar Words and Contexts in Natural Language with SenseClusters", 2005, pp. 1-2.*

(Continued)

*Primary Examiner* — Apu Mofiz
*Assistant Examiner* — Jared Bibbee
(74) *Attorney, Agent, or Firm* — Remarck Law Group PLC

(57) ABSTRACT

Many websites publish variants of their web pages based on language and region. However, when a user is directed toward the incorrect web page for the user's language preference, it there is not a simple way for the user to select the appropriate localized or region specific version of the web page. According to an embodiment, a language preference from a user may be received. A first language for a first web page may be identified and the first web page may be received by a computing device of the user. A second language for a second web page may be identified. The second web page may comprise an alternate version of the first web page. The first web page or the second web page may be selected according to the language preference of the user and the selected web page may be presented to the user.

18 Claims, 4 Drawing Sheets

(56) References Cited

U.S. PATENT DOCUMENTS

| | | | | |
|---|---|---|---|---|
| 2003/0176996 | A1* | 9/2003 | Lecarpentier | 704/7 |
| 2004/0167768 | A1* | 8/2004 | Travieso et al. | 704/2 |
| 2004/0205118 | A1* | 10/2004 | Yu | 709/203 |
| 2007/0094006 | A1* | 4/2007 | Todhunter et al. | 704/8 |
| 2008/0281804 | A1* | 11/2008 | Zhao et al. | 707/5 |
| 2009/0287471 | A1* | 11/2009 | Bennett | 704/3 |
| 2010/0286977 | A1* | 11/2010 | Chin et al. | 704/4 |
| 2010/0313255 | A1* | 12/2010 | Khuda | 726/7 |
| 2012/0016655 | A1* | 1/2012 | Travieso et al. | 704/2 |
| 2013/0060751 | A1* | 3/2013 | Cooke | 707/709 |

OTHER PUBLICATIONS

David Kirk Evans, "Identifying Similarity in Text: Multi-Lingual Analysis for Summarization", 2005, pp. 1-184.*

Debian, "Debian web site in different languages", Apr. 10, 2008, pp. 1-5.*

Sisay Fissaha Adafre et al., "Finding Similar Sentences across Multiple Languages inWikipedia", 2006, pp. 62-69.*

Google, "Google Operating System: Unofficial news and tips about Google", Feb. 26, 2010, pp. 1-4.*

* cited by examiner

ALTERNATIVE WEB PAGES SUGGESTION BASED ON LANGUAGE

CROSS REFERENCE TO RELATED APPLICATIONS

This application claims priority to U.S. Ser. No. 61/604,976, filed Feb. 29, 2012, the contents of which are hereby incorporated by reference in its entirety.

BACKGROUND

Many websites offer alternative versions of their web pages for users who speak a different language. Typically, when a user enters either a search query or a uniform resource locator (URL), the user is directed to the web page corresponding to a language determined by one or more language indicators. A variety of language indicators may be obtained without requiring any interaction from the user. For example, a user's internet protocol (IP) address may indicate a geolocation of a user and, generally, most users will have fluency in the primary language associated with the originating source of the IP address. Similarly, many users have indicated a language in which they would prefer to browse content when they installed web browsing software.

While routing of users to a particular language version of a web page is generally reliable, in some instances an error in routing users may occur. In other instances a user may conduct a search for a particular web site and inadvertently select a link for a web page that is not best suited for the user's language preference, if such a link is provided at all. When a user is directed toward the wrong version of a web page, it delays the user from accessing desired content and creates an uneven web browsing experience.

SUMMARY

According to an embodiment of the disclosed subject matter, a language preference from a user may be received. A first language for a first web page may be identified and the first web page may be received by a computing device of the user. A second language for a second web page may be identified. The second web page may include an alternate version of the first web page. The first web page or the second web page may be selected according to the language preference of the user and the selected web page may be presented to the user.

In another embodiment a language preference from the user may be received. The language preference of the user may include an ordered list of language preferences of the user, an application-specific language override of the user, or both. A plurality of web pages may be detected; the plurality of web pages may include an alternative version of one of the plurality of web pages. The plurality of web pages may be detected by detecting content on at least two of the plurality of web pages. The content detected on the at least two of the plurality of web pages may be compared. Similar content between the at least two of the plurality of web pages may be identified. The similar content may comprise parallel data. The at least two of the plurality of web pages may be identified as alternate versions of the web page.

A language for each of a plurality of web pages may be determined. One of the plurality of web pages may include a human translated version of the one of the plurality of web pages, a web page specified by a site owner, an embedded application, the embedded application permitting a translation of the web page, or an indexed web page. A request for one of the plurality of web pages may be received from the user. The language of the requested one of the plurality of web pages may be compared to the language preference of the user. A determination may be made as to whether the language preference of the user matches a language of the requested one of the plurality of web pages and one of the plurality of web pages may be selected in accordance with the language preference of the user. The selection of one of the plurality of web pages may include an input from the user. The selected one of the plurality of web pages may be provided to the user. One of the plurality of web pages may be provided to the user prior to the step of determining whether the language preference of the user matches a language of the requested one of the plurality of web pages.

In another embodiment a system that includes a database for storing a language preference from the user and a processor that is connected to the database. The language preference of the user may include an ordered list of language preferences of the user, an application-specific language override of the user, or both. The processor may be configured to detect a plurality of web pages; the plurality of web pages may include an alternative version of one of the plurality of web pages. The plurality of web pages may be detected by detecting content on at least two of the plurality of web pages. The content detected on the at least two of the plurality of web pages may be compared. Similar content between the at least two of the plurality of web pages may be identified. The similar content may comprise parallel data. The at least two of the plurality of web pages may be identified as alternate versions of the web page.

The processor may be configured to determine a language for each of a plurality of web pages. One of the plurality of web pages may include a human translated version of the one of the plurality of web pages, a web page specified by a site owner, an embedded application, the embedded application permitting a translation of the web page, or an indexed web page. The processor may receive a request for one of the plurality of web pages from the user and it may compare the language of the requested one of the plurality of web pages to the language preference of the user. The processor may determine whether the language preference of the user matches a language of the requested one of the plurality of web pages and select one of the plurality of web pages in accordance with the language preference of the user. The selection of one of the plurality of web pages may include an input from the user. The processor may be configured to provide the selected one of the plurality of web pages to the user. One of the plurality of web pages may be provided to the user prior to the step of determining whether the language preference of the user matches a language of the requested one of the plurality of web pages.

Additional features, advantages, and embodiments of the disclosed subject matter may be set forth or apparent from consideration of the following detailed description, drawings, and claims. Moreover, it is to be understood that both the foregoing summary and the following detailed description are exemplary and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural

DETAILED DESCRIPTION

Many websites publish variants of their web pages based on language and region. However, when a user is directed toward the incorrect web page for the user's language preference, typically there is not a seamless way for the user to select the appropriate localized or region specific version of the web page. According to embodiments of the subject disclosure, a user may be redirected to a page that matches a user's language preference. For example, a user with a language preference for French, Chinese, and Hindi may conduct a search from the United States for a computer manufacturer. The user will likely return and select an English site for the computer manufacturer based upon the geolocation of the user. However, using the user's language preference, the user may be notified of the presence of an alternate version of the web site, if one is available, that is more closely aligned with the user's language preference. The user may be presented, for example, with a prompt that allows the user to select one of the available alternatives that matches the user's language preference. Alternate versions of websites may be obtained, for example, from a web crawler, URL similarity, a website owner, or a human translator. URL similarity compares two URLs and determines whether only the language code differs between the two URLs or not. In addition to URL similarity, other parallel data may be used to ascertain whether alternate versions of a website exist.

Figure 1:
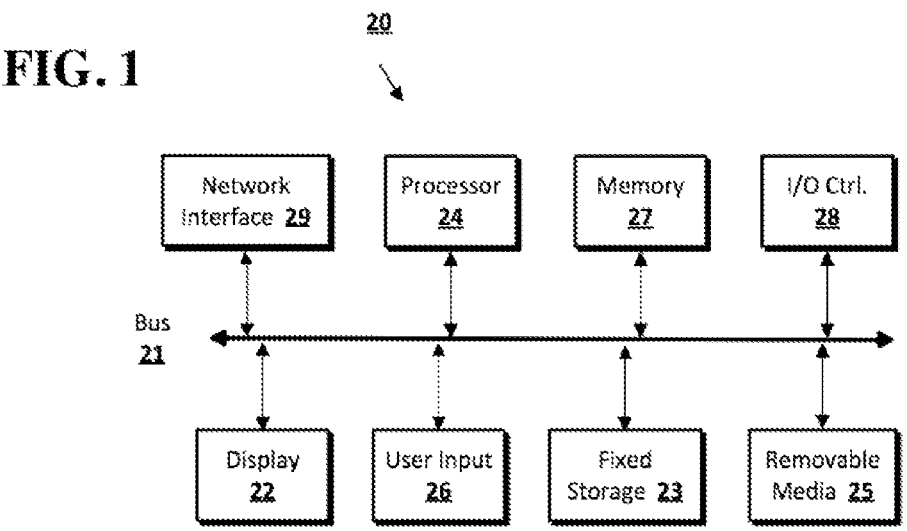
FIG. 1 shows a computer according to an embodiment of the disclosed subject matter.

Embodiments of the presently disclosed subject matter may be implemented in and used with a variety of component and network architectures. FIG. 1 is an example computer 20 suitable for implementing embodiments of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 2.

Many other devices or components (not shown) may be connected in a similar manner (e.g., document scanners, digital cameras and so on). Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, removable media 25, or on a remote storage location.

Figure 2:
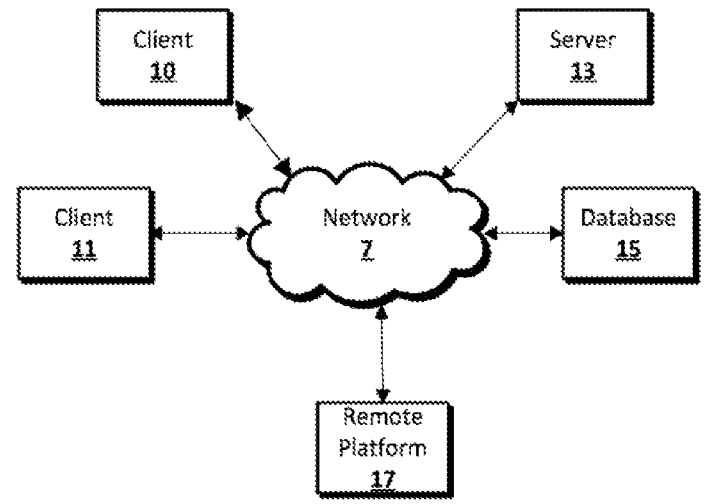
FIG. 2 shows a network configuration according to an embodiment of the disclosed subject matter.

FIG. 2 shows an example network arrangement according to an embodiment of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

Figure 3:
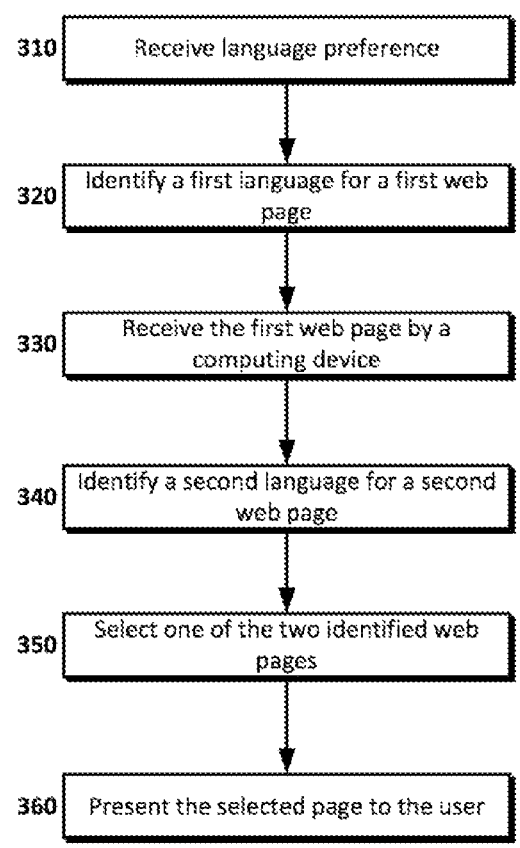
FIG. 3 shows an example arrangement and information flow for identifying alternative versions of a web page and properly routing the user to the correct web page based on the user's language preference according to an embodiment of the disclosed subject matter.

FIG. 3 shows an example embodiment of the disclosed subject matter. At 310 a language preference may be received from a user. The language preference, as described below, may be obtained from both user input or from language indicators. A first language for a first web page may be identified at 320 and the first web page may be received by a computing device of the user at 330. For example, a user may inadvertently, by selecting a suboptimal search result or by an error in routing the user's web page request, end up on a web page that is not best suited for the user's received language preference. A second language for a second web page may be identified at 340. The second web page may include an alternate version of the first web page. An alternative web page may be identified using a number of methods described in detail below. For example, the browser may include a software module that detects that the web page that it retrieved is primarily in a language differing from the user's language preference. In response to detecting this difference, the browser can send a request to an index server for alternate versions of the same page that are primarily in the language that is the user's language preference. The index server can return the address of one or more such alternate versions or can return the contents of such pages themselves. The browser can then request the alternate version of the web page and on receiving the contents of the page can render it for the user.

The first web page or the second web page may be selected according to the language preference of the user and the selected web page may be presented to the user at 350. This process may be performed automatically or upon the receipt of an input from the user. For example, a user may configure her browser to automatically route her to web pages that best align with her language preference. Alternatively, a user may be presented with an option to select either the first web page or the second web page, such as in a pop-up window, a banner, or toolbar in a web browser. The first and second web page may be presented to the user for selection in a variety of ways including graphical or textual manners such as by presenting the user with a textual list of the alternative versions available to the user or by presenting the user with icons representing one or more of the alternative web pages present at 360. In some embodiments, both the first and second web page are displayed to the user, e.g., adjacent to one another in a left and right panel, or it can overlay the text in the user's preferred language over the corresponding text in the language of the first web page.

Figure 4:
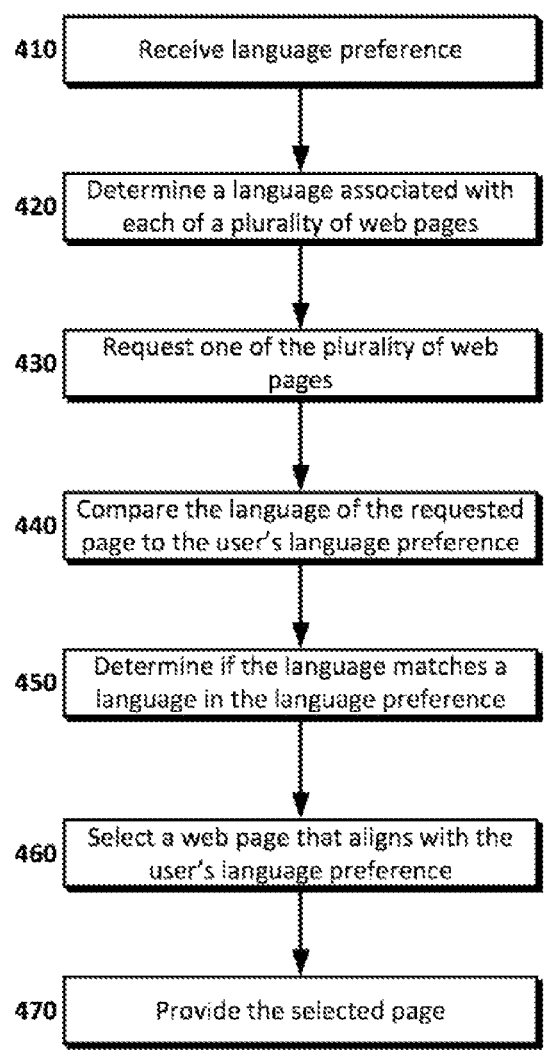
FIG. 4 shows an example of identifying and selecting an alternative web page based on the user's language preference according to an embodiment of the disclosed subject matter.

FIG. 4 shows another embodiment of the disclosed subject matter. At 410, a language preference from the user may be received. A language preference may include at least one language in which the user prefers to have content provided. The language preference may be stored to a computer readable medium. It may also be accessed from the computer readable medium by a computing device, such as a server or mobile phone, or an application. A language preference may include an application-specific language override of the user. A language preference can be stored in a location remote from the user, e.g., on a server with appropriate access controls , or both. For example, it can be stored with or in association with a user's account profile. The language preference can be stored locally, e.g., (e.g., as part of an application preference), or can be stored both locally and remotely.

One or more languages for the user may be obtained from a language preference which may be input by the user or stored for the user. Alternatively, a user may decide not to specify a language preference. In that instance, the language preference may be inferred from a variety of language indicators. Typically, language indicators may include: (1) a URL parameter, (2) user application-specific overrides, (3) general user language preferences, (4) cookies, (5) a browser accept-language, (6) language overrides for other applications in descending usage order, (7) a user agent, (8) an enterprise administrator's language policy setting, and (9) an IP address. A URL parameter, cookies, a browser accept-language, a user agent, a domain, and an IP address. A URL parameter includes computer-readable code, such as "hl=" followed by a language tag, included in a URL to the desired language a user would like a web page to display. A cookie can include computer-readable code that can transmit state information from a web page to a user's browser and from a user's browser to the web page. The "accept-language" computer readable code specifies the languages a browser may use.

A language preference may be received, for example, as part of a language selection control. The language preference selection control may allow a user to establish a list, which may itself be ordered, of languages the user would like to have content displayed in. It may also allow a user to specify a hierarchy for language presentation. For example, if the user desires content in French, Chinese, and Hindi these languages may be indicated in the language preference selection control. The order of the languages may also be stored and used or accessed when a language is presented to the user. Continuing the example, if content is not available in the French language, but is available in Chinese or Hindi, a language resolution program may select the Chinese language for the content because it is the next most-preferred language in which the user desires content to be presented.

A language for each of a plurality of web pages may be determined at 420. Each of the web pages may be an alternate version of one of the plurality of web pages. For example, a multinational corporation (or any entity or person) may maintain separate web sites or web pages for different languages. The different web pages maintained by the corporation represent alternative versions of a web page (e.g., an English web page for the corporation may be an alternative version of a French web page for the corporation, where the pages contain similar content). For example, these web pages can each be human authored translations of a given base page.

In an embodiment of the disclosed subject matter, alternative versions of a web page may be detected. In some embodiments, the alternative versions are identified by an index system, e.g., that receives crawled web pages. For example web crawling services typically obtain information or data about web pages they visit. Information may include, for example, the type of content present on the page, language used on the page, text, or source code, or other information relating to the content also may be obtained. Some of these data may be referred to as parallel data in that they result from a comparison of at least two web pages that were crawled from a given domain. For example, a URL for one page may differ from a URL for another page from the same domain only in the language that is specified. Similarly, parallel documents may be identified on separate web pages of the same domain. The parallel data may suggest the existence of alternate versions of a web page. For example, similarly named documents or similar pictures or text may indicate that two web pages are alternative versions of one another. The method of detecting an alternative version of the web page can include detecting content on at least two of the detected web pages; the web pages may be linked by, for example, the domain owner for the page or otherwise have an indication that the pages relate to the same entity (e.g., person or business). Alternatively, the web pages may be unlinked, e.g., they may be from different domains. The content on the detected web pages may be compared to one another. For example, two web pages may contain a document that only differs in the language in which it is presented or named. Such a document would be identified as and constitute similar content. A web page identified as containing similar content may be identified as being an alternate version of the other page on which the similar content was detected.

In some embodiments, the index system includes functionality to compare received documents. Documents are determined by the system to have similar or substantially identical content. For example, documents can be machine translated into a common base language (e.g., English), and then compared using algorithms that measure documents similarity or that detect duplicate documents. Clusters of documents with similar translated content, but being authored in different languages can be identified, and information about the cluster (including an identifier for the document for each language that it was identified in) can be stored by the index. On receiving a request for an alternate version of a particular document, the index system can access the cluster information and return the URL or contents of the corresponding alternate version of the document based on a user language preference.

A request for one of the web pages may be received from the user at 430. The plurality of web pages may be obtained from, for example, web crawling data or other web page indices. For example, a user might conduct a search for a company which has a web site available in multiple languages. The first search result retuned to the user might be for the website with a language associated with the user's current geographic location. The user may select the first result returned from the search, failing to see other search results that may indicate the alternative web pages that align with the user's language preference. Despite the user's selection the first result, the user may prefer to receive content in a separate language based upon the user's language preference. Alternatively, the user may be redirected to a web page that is not the correct page for the user's language.

The language of the requested web page may be compared to the language preference of the user at 440. The requested web page may be provided to the user prior to the step of determining whether the language preference of the user matches a language of the requested web page. For example, a web page selected by the user from a list of search results may be loaded into a web browser before the language preference of the user is compared to the loaded web page. A determination may be made as to whether the language preference of the user matches a language of the requested web page at 450 based upon the comparison at 440. The user's language preference may be compared to available alternative web pages. For example, a comparison of the user's language preference to alternative web pages may be executed on a server which has access to the user's language preference or by the user's local computer.

At 460, one of the web pages may be selected in accordance with the language preference of the user. If the user's language preference does not contain a language that matches the ascertained or determined language of one of the web pages, a user may receive an offer to translate the page to a language that is aligned with the user's language preference. If a match between a language in the user's language preference and one of the web pages is determined, one of the alternate versions of the web page may be provided to the user. For example, a user may be presented with an option to select from a series of web pages that match the user's language preferences. These pages may be presented as thumbnail images from which the user may input a selection. The user's input may include, for example, a keyboard stroke, mouse click, or selection on a mobile device. They may be presented as a component of a web browser plug-in that allows the user to specify which page the user would like to be redirected toward. In another example, the web page that is most closely aligned with the user's language preference may be automatically selected.

The selected web page may be provided to the user or a computing device at 470. In some instances, a translation of a web page may have been created by a human being as opposed to being machine translated. The human translated version of the web page may be one of the pages provided to the user. In still other instances, a web site owner may specify a web page for a user with a certain language preference and this specified page may be one of the web pages as well. One or more of the web pages may include an embedded application. The embedded application may permit a translation of the web page. The selected web page may be provided to the user by a server or by the user's local computing device.

Figure 5:
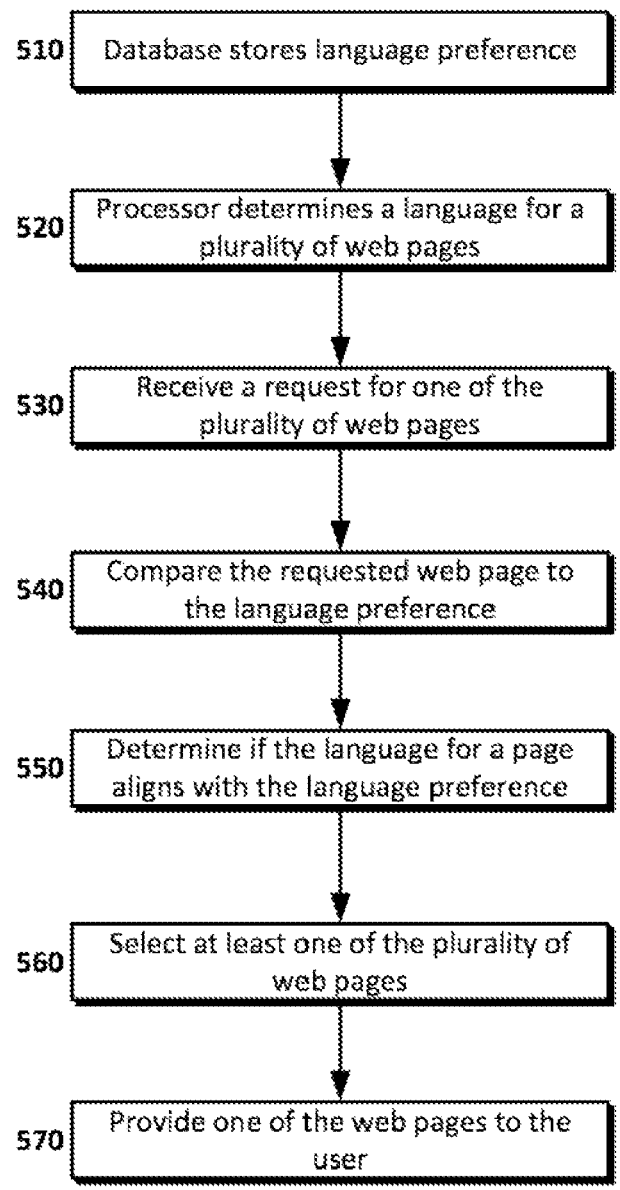
FIG. 5 shows an example computational system for identifying alternative versions of a web page and properly routing the user to the correct web page based on the user's language preference according to an embodiment of the disclosed subject matter.

A system according to an embodiment of the disclosed subject matter may include a database for storing a language preference from the user, and a processor that is connected to the database as shown in FIG. 5 at 510. The language preference of the user may include an ordered list of language preferences of the user, an application-specific language override of the user, or both. The processor may be configured to determine a language for each of a plurality of web pages at 520. In an embodiment of the disclosed subject matter, the processor may be configured to detect a web page. The processor may, for example, use web crawling data to identify one or more alternative versions of a web page or utilize parallel data to identify an alternate version of a web page. The system disclosed herein may detect content on at least two of the detected web pages; the web pages may be linked by, for example, the domain owner for the page or otherwise have an indication that the pages relate to the same entity (i.e., person or business). The processor may be configured to compare the content on the two detected web pages to one another. For example, two web pages may contain a document that only differs in the language in which it is presented or named. Such a document would be identified as and constitute similar content. A web page identified as containing similar content may be identified as being an alternate version of the other page on which the similar content was detected. Each of the plurality web pages may be an alternate version of one of the web pages. That is, the set of available web pages may include a first version of a web page, and one or more additional versions of the same web page.

One or more of the web pages may include, for example a human translated version of the one of the plurality of web pages, a web page specified by a site owner, an embedded application, the embedded application permitting a translation of the web page, or an indexed web page. The processor may receive a request for one of the web pages from the user at 530, and it may compare the language of the requested web page to the language preference of the user at 540. The language preference of the user may be stored to a central computing storage unit, cached locally, or stored locally to a user's computing device. The processor may access the stored or cached language preference to determine whether or not any of the identified alternative pages matches the user's language preference. The processor may determine whether the language preference of the user matches a language of the requested one of the plurality of web pages and select one of the plurality of web pages in accordance with the language preference of the user at 550. The selection of one of the plurality of web pages may include an input from the user. The processor may be configured to select one of the web pages at 560. The selection may involve more than one web page or even each of the web pages. For example, it may be desirable to select any of the web pages that contain a language that is also listed in the user's language preference. A web page also may be provided to the user before it is determined whether the language preference of the user matches a language of the requested one of the plurality of web pages at 570.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computer-implemented method comprising:
    identifying, at a server having one or more processors, a preferred language for a computing device associated with a user;
    receiving, at the server from the computing device, an input indicative of a search request or at least a portion of a uniform resource locator (URL);
    obtaining, at the server, a plurality of suggested web pages corresponding to the input;
    outputting, from the server to the computing device, the plurality of suggested web pages;
    receiving, at the server, an explicit request from the computing device for a first web page of the plurality of suggested web pages that comprises text substantially in a language that differs from the preferred language, the explicit request having been generated via an error in routing an original request for another web page from the computing device, the other web page being different than the first web page;
    in response to detecting the explicit request, identifying, by the server, a second web page representing an alternate version of the first web page, the second web page comprising text substantially in the preferred language; and
    providing, from the server to the computing device, information enabling the computing device to access the second web page.

2. The method of claim 1 wherein identifying the second web page comprises identifying cluster information that associates web pages having similar content in different languages.

3. The method of claim 1 further comprising:
    prior to the identifying, receiving information about crawled web pages; and
    generating cluster information for crawled web pages that have similar content in different languages.

4. A computer-implemented method comprising:
    transmitting, from a computing device associated with a user and having one or more processors, a preferred language to a server;
    receiving, at the computing device from the user, an input indicative of a search request or at least a portion of a uniform resource locator (URL);
    transmitting, from the computing device to the server, the input;
    receiving, at the computing device from the server, a plurality of suggested web pages corresponding to the input;
    transmitting, from the computing device to the server, an explicit request for a first web page of the plurality of suggested web pages that comprises text substantially in a language that differs from the preferred language, the explicit request having been generated via an error in routing an original request for another web page from the computing device, the other web page being different than the first web page; and
    in response to transmitting the explicit request, receiving, at the computing device from the server, information enabling the computing device to access a second web page representing an alternate version of the first web page, the second web page comprising text substantially in the preferred language.

5. The method of claim 4, further comprising in response to receiving the information, automatically displaying the second web page to the user without displaying the first web page.

6. The method of claim 4 wherein identifying a second web page comprises detecting information in the first web page about alternate versions of the first web page.

7. A system comprising:
    a database storing a preferred language for a computing device associated with a user; and
    a processor connected to the database, the processor configured to:
        detecting an explicit request from the computing device for a first web page that comprises text substantially in a language different from the preferred language, the explicit request having been generated via an error in routing an original request for another web page from the computing device, the other web page being different than the first web page;
        in response to detecting the explicit request, identifying a second web page representing an alternate version of the first web page, the second web page comprising text substantially in the preferred language; and
        providing, to the computing device, information enabling the computing device to access the second web page.

8. The system of claim 7, wherein the processor is configured to identify the second web page by:
    detecting a set of web pages each representing an alternative version of the first web page; and
    selecting one of the set of web pages to obtain the second web page.

9. The system of claim 8, wherein the detecting further comprises:
    detecting content on the first web page and each of a plurality of web pages;
    comparing the content detected on the first web page to the content detected on each of the plurality of web pages to identify similar content comprising parallel data; and
    identify the set of web pages as those of the plurality of web pages having similar content comprising parallel data with the first web page.

10. The method of claim 1, wherein providing the information enabling the computing device to access the second web page includes providing, from the server to the computing device, the second web page.

11. The method of claim 1, further comprising preventing, by the server, the computing device from accessing the first web page by (i) identifying the second web page and providing, to the computing device, the information enabling the computing device to access the second web page.

12. The method of claim 4, wherein receiving the information enabling the computing device to access the second web page includes receiving, at the computing device from the server, the second web page.

13. The method of claim 4, wherein receipt of the explicit request causes the server to prevent the computing device from accessing the first web page by (i) identifying the second web page and providing, to the computing device, the information enabling the computing device to access the second web page.

14. The system of claim 7, wherein providing the information enabling the computing device to access the second web page includes providing, to the computing device, the second web page.

15. The system of claim 7, wherein the operations further comprise preventing the computing device from accessing the first web page by (i) identifying the second web page and providing, to the computing device, the information enabling the computing device to access the second web page.

16. The method of claim 1, wherein the error in routing the original request for the other web page is caused by a detected geolocation of the computing device.

17. The method of claim 4, wherein the error in routing the original request for the other web page is caused by a detected geolocation of the computing device.

18. The system of claim 7, wherein the error in routing the original request for the other web page is caused by a detected geolocation of the computing device.

* * * * *